United States Patent
Leopold et al.

(10) Patent No.: US 8,497,783 B2
(45) Date of Patent: Jul. 30, 2013

(54) DEVICE AND METHOD FOR DETERMINING THE DIRECTION, SPEED AND/OR DISTANCE OF VEHICLES

(75) Inventors: Alexander Leopold, Vienna (AT); Andreas Schechora, Wiener Neustadt (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 401 days.

(21) Appl. No.: 12/896,825

(22) Filed: Oct. 1, 2010

(65) Prior Publication Data

US 2011/0080306 A1    Apr. 7, 2011

(30) Foreign Application Priority Data

Oct. 1, 2009   (EP) ..................................... 09450188

(51) Int. Cl.
*G08G 1/01* (2006.01)
*G06K 9/00* (2006.01)

(52) U.S. Cl.
USPC ........... 340/935; 340/936; 340/937; 340/942; 340/556; 340/903; 382/104; 348/148

(58) Field of Classification Search
USPC .................. 340/935, 936, 937, 942
See application file for complete search history.

(56) References Cited

U.S. PATENT DOCUMENTS

| | | | |
|---|---|---|---|
| 5,509,082 A * | 4/1996 | Toyama et al. ............... | 382/104 |
| 5,537,110 A | 7/1996 | Iida et al. | |
| 5,757,287 A * | 5/1998 | Kitamura et al. ............. | 340/937 |
| 5,757,472 A | 5/1998 | Wangler et al. | |
| 5,771,485 A * | 6/1998 | Echigo ........................... | 701/119 |
| 5,793,491 A | 8/1998 | Wangler et al. | |
| 5,809,161 A * | 9/1998 | Auty et al. ..................... | 382/104 |
| 5,821,879 A | 10/1998 | Liepmann | |
| 5,995,900 A * | 11/1999 | Hsiao et al. ................... | 701/117 |
| 6,195,019 B1 * | 2/2001 | Nagura ......................... | 340/928 |
| 6,198,987 B1 | 3/2001 | Park et al. | |
| 6,304,321 B1 | 10/2001 | Wangler et al. | |
| 6,404,506 B1 * | 6/2002 | Cheng et al. .................. | 356/634 |
| 2002/0140924 A1 | 10/2002 | Wangler et al. | |
| 2003/0062416 A1 | 4/2003 | Smith et al. | |
| 2003/0189500 A1 | 10/2003 | Lim | |
| 2007/0228262 A1 * | 10/2007 | Cantin et al. .................. | 250/221 |
| 2008/0278365 A1 | 11/2008 | Klein et al. | |

FOREIGN PATENT DOCUMENTS

| | | |
|---|---|---|
| EP | 1 048 961 A2 | 11/2000 |
| EP | 1 446 678 B1 | 8/2004 |
| JP | 5-143887 | 6/1993 |
| JP | 5-312818 | 11/1993 |

(Continued)

OTHER PUBLICATIONS

European Search Report for corresponding European patent application No. 09 450 188.9, dated Dec. 28, 2009, pp. 4.

(Continued)

*Primary Examiner* — Donnie Crosland
(74) *Attorney, Agent, or Firm* — Christie, Parker & Hale, LLP

(57) ABSTRACT

The invention relates to the determination of direction, speed and/or distance of vehicles on a roadway by means of a sensor, which operates according to the light-section procedure and is directed onto the roadway, for recording the surface contour of a vehicle, and an evaluation unit, which is connected to the sensor and determines the direction, speed and/or distance of the vehicles therefrom.

18 Claims, 4 Drawing Sheets

FOREIGN PATENT DOCUMENTS

| | | |
|---|---|---|
| JP | 10-105866 | 4/1998 |
| JP | 11-232587 | 8/1999 |
| JP | 2000-339586 | 12/2000 |
| JP | 2002-183881 | 6/2002 |
| JP | 2008-59260 | 3/2008 |
| WO | WO 03/036319 A2 | 5/2003 |
| WO | WO 2005/017853 A1 | 2/2005 |
| WO | WO 2007/134632 A1 | 11/2007 |

OTHER PUBLICATIONS

He et al., "A Novel Algorithm for Estimating Vehicle Speed from Two Consecutive Images", IEEE Workshop on Applications of Computer Vision (WACV'07), The Computer Society, 2007, pp. 6.

Examination Report issued in corresponding New Zealand Patent Application No. 587585, dated Aug. 31, 2010, 2pp.

Examination Report issued in corresponding New Zealand Patent Application No. 587583, dated Aug. 31, 2010, 2pp.

Huelsmann, Axel et al.; "Machine Vision: Laser projections assist machine-vision applications"; Laser Focus World; vol. 43; Issue 5; 2007; 6pp.

Office action issued in corresponding Chilean Patent Application No. 1007-10, dated Sep. 27, 2010, 7pp.

Office action issued in corresponding Chilean Patent Application No. 1009-10, dated Sep. 27, 2010, 6pp.

Office action issued in corresponding European Patent Application No. 09 450 188.9, dated Apr. 11, 2013, 13pp.

Opposition issued in corresponding European Patent Application No. 09 450 188.9, dated Aug. 9, 2012, 14pp.

Opposition issued in corresponding European Patent Application No. 09 450 186.3, dated Apr. 27, 2012, 17 pp.

Extended European Search Report for corresponding European Patent Application No. 09 450 186.3, dated Mar. 17, 2010, 5pp.

\* cited by examiner

DEVICE AND METHOD FOR DETERMINING THE DIRECTION, SPEED AND/OR DISTANCE OF VEHICLES

CROSS-REFERENCE TO RELATED APPLICATION(S)

This application claims priority to European Patent Application No. 09 450 188.9, filed on Oct. 1, 2009, the contents of which are hereby expressly incorporated by reference.

FIELD OF THE INVENTION

The present invention relates to devices and methods for determining the direction, speed and/or distance of vehicles on a roadway.

BACKGROUND

The determination of the direction and speed of a vehicle is of decisive importance in traffic monitoring and control for the detection of ghost drivers and compliance with speed restrictions. The determination of the distance between vehicles is used in tunnels, for example, to ensure that minimum distances are complied with to avoid rear end collisions.

A wide variety of systems are currently in use to determine the direction, speed and distance between vehicles, such as the use of light barriers, induction loops embedded into the roadway, radar or laser scanners etc. What all the known systems have in common is that they are extremely expensive. For example, induction loops require the surface of the roadway to be opened up, light barriers require installations on both edges of the roadway, and radar or laser scanners are structurally complex and costly and possibly emit undesirable disturbing electromagnetic radiation.

SUMMARY

The present invention provides devices and methods for determining the direction, speed and/or distance of vehicles that are easier to achieve than the known solutions.

In a first aspect of the invention, a device distinguished by a sensor operates according to the light-section procedure and is directed onto the roadway, records the surface contour of a vehicle. An evaluation unit, which is coupled to the sensor determines the direction and/or speed of the vehicle from the displacement in the surface contour of the vehicle in two time-consecutive recordings.

In a second aspect, the invention includes a device distinguished by a sensor, which operates according to the light-section procedure and is directed onto a section of the roadway, for recording the surface contours of vehicles in the section; and an evaluation unit, which is connected to the sensor and determines the distance between vehicles following one another from the surface contours.

In this way, the light-section procedure known in the art is used for the first time for determining the direction of travel, speed and distance of vehicles. Light-section sensors project structured light, e.g. a single bar of light ("fan" of light or "line" of light), multiple parallel bars of light ("fringes" of light, so-called "fringe projection") or even a complete grid of light at a first angle onto an object to be detected and record the object with the structure projected thereon from an angle differing from the direction of projection. As a result, the surface contour of the object can be determined from distortions of the structure in the recorded image.

The devices according to the invention generally do not require any installations in the roadway and can be mounted on only a single side of the roadway and compared to radar or laser scanning systems. Moreover, the devices require very simple light projection, camera and image processing means.

In some embodiments, the sensor comprises a light pattern projector, which projects a pattern of light, for example, a grid of light, from a first location onto the roadway, and also a camera, which records the projected pattern of light from a second location and determines the surface contour from the distortions thereof, as is known in the art.

In some embodiments, multiple light pattern projectors are mounted consecutively on the ceiling of the tunnel, which project a grid of light recorded by a joint camera onto the roadway. The ceiling of the tunnel can thus be used to mount the light pattern projectors and therefore a large section, if not the entire tunnel, can be illuminated with the grid of light.

The light pattern projector may be a laser or light-emitting diode emitter by means of which high luminances can be achieved.

The invention also provides the possibility of using an already existing traffic monitoring camera as camera, which further reduces structural expense.

In a third aspect, the invention is a method for determining the direction and/or speed of a vehicle on a roadway. The method includes projecting a pattern of light, for example, a grid of light, onto the roadway from a first location and recording the projected pattern of light from a second location to create a first recording of the surface contour of a vehicle from distortions of the pattern of light. This process is repeated at a later time point to create a second recording of the surface contour of the vehicle and the direction and speed of the vehicle is determined from the shift of its surface contour in the two recordings.

In a fourth aspect, the invention provides a method for determining the distance between vehicles on a roadway. The method includes projecting a pattern of light, for example, a grid of light, onto a section of the roadway from at least one first location; recording the projected pattern of light from a second location to detect the surface contours of vehicles in the section from distortions of the pattern of light; and determining the distance between vehicles following one another in the section from the detected surface contours.

On large traffic areas, multiple sensors or devices can be used that work together in combination and follow the movement of vehicles.

BRIEF DESCRIPTION OF THE DRAWINGS

The invention shall be explained in more detail below on the basis of exemplary embodiments illustrated in the attached drawings.

DETAILED DESCRIPTION

Figure 1:
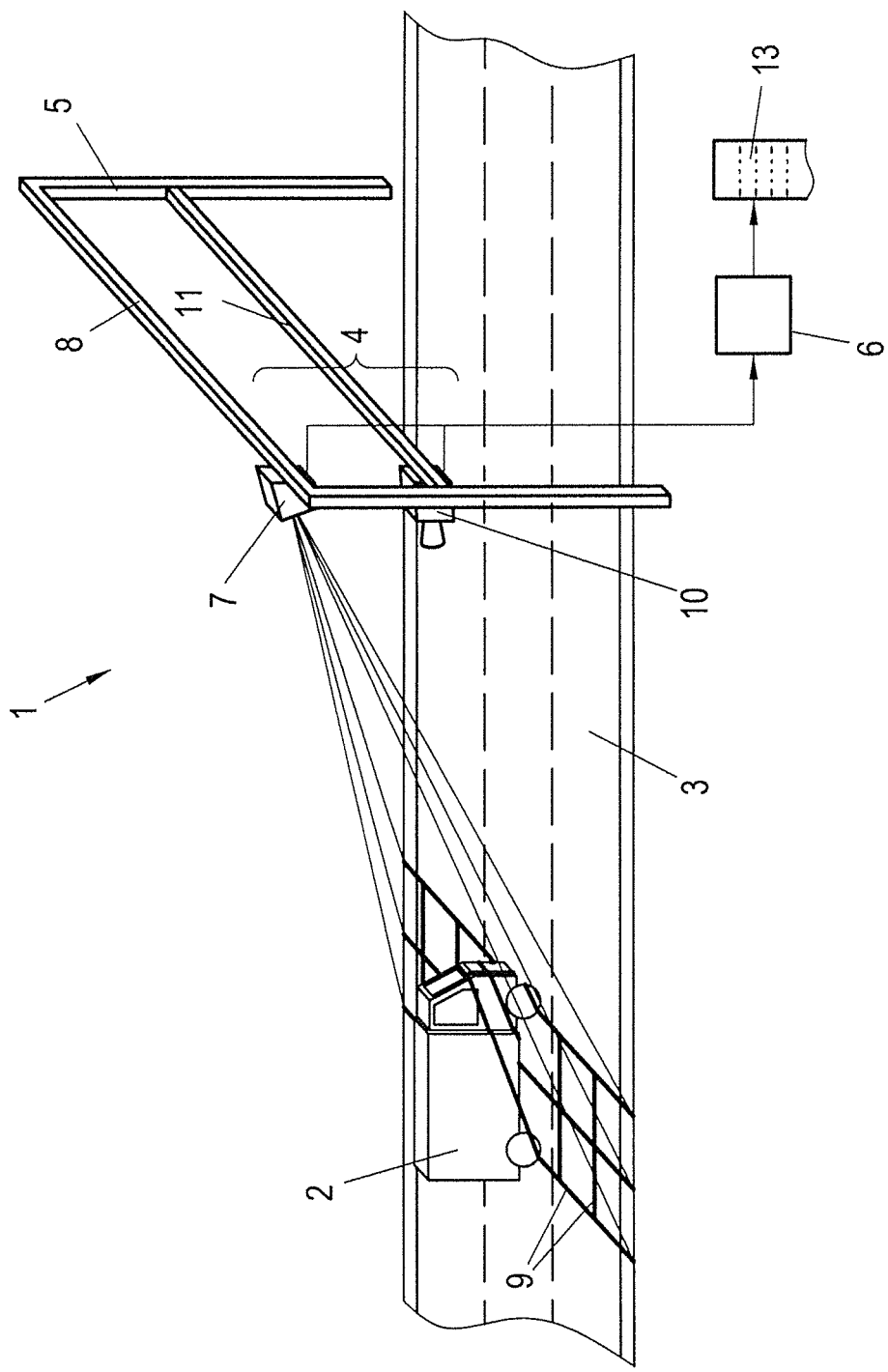
FIG. 1 is an exemplary schematic perspective view of the device showing a method of the invention for determining the direction and/or speed of a vehicle, according to some embodiments of the present invention.
Figure 2A:
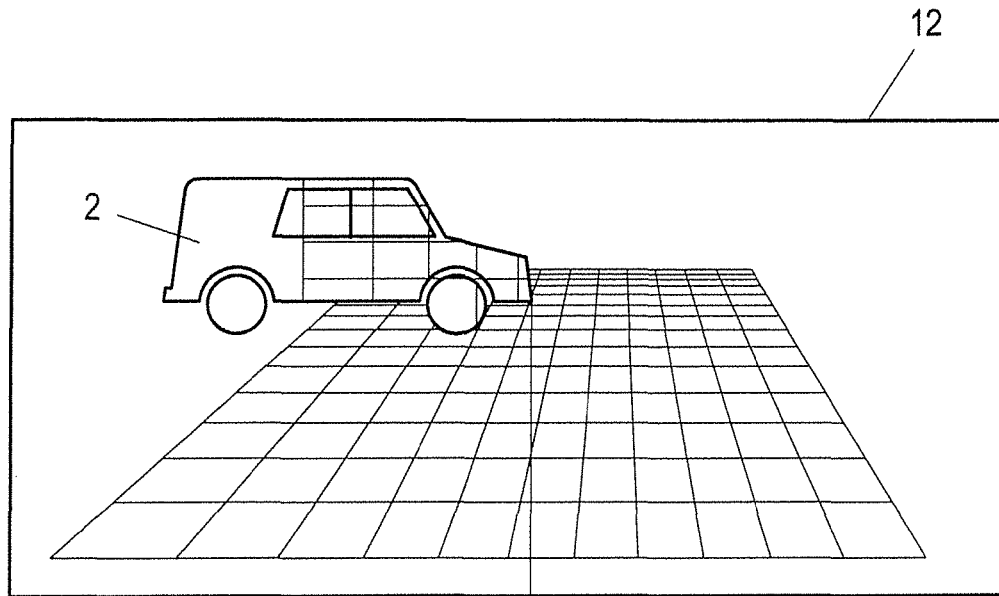
FIGS. 2a and 2b shows two time-consecutive recordings of the pattern of light projected onto the roadway on passage of a vehicle on the roadway.
Figure 2B:
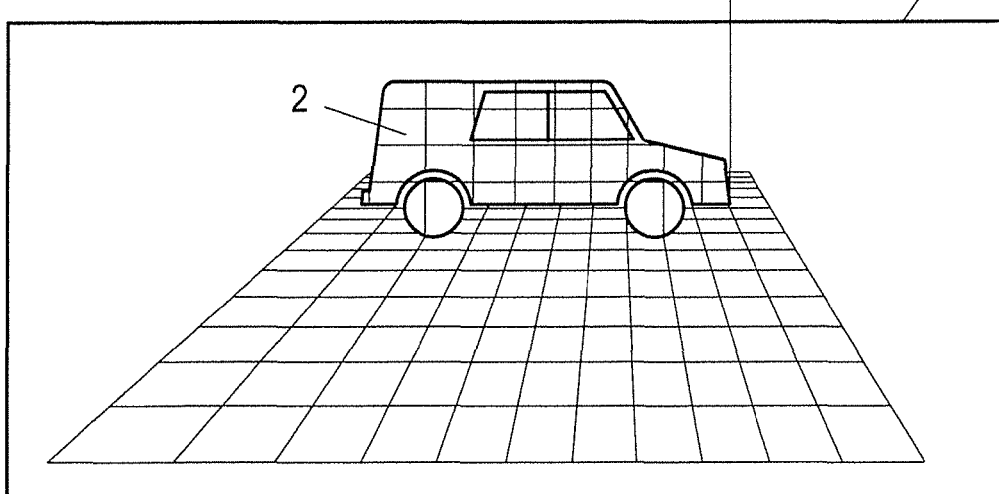

FIG. 1 shows an exemplary device 1 for determining the direction and/or speed of a vehicle 2 on a roadway 3. The device 1 has a sensor 4, which operates according to the light-section procedure, is mounted on a bridge girder 5 spanning the roadway 3 and is connected to an evaluation unit 6. The sensor 4 comprises a light pattern projector 7, which projects a pattern of light 9 onto the roadway 3 from a first location—here an upper girder 8 of the bridge 5—and also a camera 10, which records an image 12, 13 of the projected pattern of light 9 from a second location—here a lower girder 11 of the bridge 5—, as is shown in FIGS. 2a and 2b for two consecutive points in time.

At each of these time points, the evaluation unit 6 determines the surface contour of the vehicle 2 from distortions of the pattern of light 9 in the images 12, 13, as occur as a result of the surface relief of a vehicle 2 from the viewing angle of the camera 8 different from the direction of light projection.

From the displacement Δs of the surface contour of the vehicle 2 in the two recorded images 12, 13, the evaluation unit 6 then determines the direction or the speed v=Δs/Δt of the vehicle 2—taking into consideration the time interval Δt between the two recordings 12, 13.

The pattern of light 9 can be a single bar of light ("line" of light), a group of parallel bars of light ("fringes" of light, "fringe projection") as well as a grid of light, as shown in FIG. 2. The pattern of light 9 can consist of a grid of lines of light respectively spaced 1 m, for example. Other types of patterns of light 9 are also possible, e.g. diamond or circular patterns or other projection forms.

Any type of light source that is able to emit the pattern of light 9 can be used as light pattern projector. Laser diode emitters, whose light is spread laterally with a lens or diaphragm, for example, or emitters composed of groups of high-performance light-emitting diodes, are particularly suitable for this.

To also improve the contrast of the pattern of light 9 produced by the light projector 7 in unfavourable ambient light conditions, e.g. direct sunlight, the light pattern projector 7 can be optionally operated in a pulsed manner with high pulse peak power, wherein the camera 10 then only needs to be operated at the times of the light pulses of the light pattern projector 7.

The camera 10 can be any photographic or video camera. A traffic monitoring camera already existing on the roadway 3 is preferably used as camera, e.g. a camera of a road toll station intended for recording toll offences.

The light pattern projector or projectors 7 and the camera 10 can be arranged in any desired different positions so long as the projected pattern of light 9 is recorded from a different direction to that of its projection. It is also possible to arrange more than one light pattern projector 7 at different positions, e.g. to illuminate the roadway 3 or the vehicle 2 from different angles to prevent shading.

In this case, the pattern of light 9 can also be composed from projections of several light pattern projectors 7, which project intersecting sets of parallel bars of light ("fringes" of light), for example. To enable the camera 10 or the evaluation unit 6 to correctly assign the lines of light in the images to the individual light pattern projectors, the sets are emitted, for example, at different wavelengths in time-division multiplex operation or are provided with different modulations or codings, as is known in the art.

Figure 3:
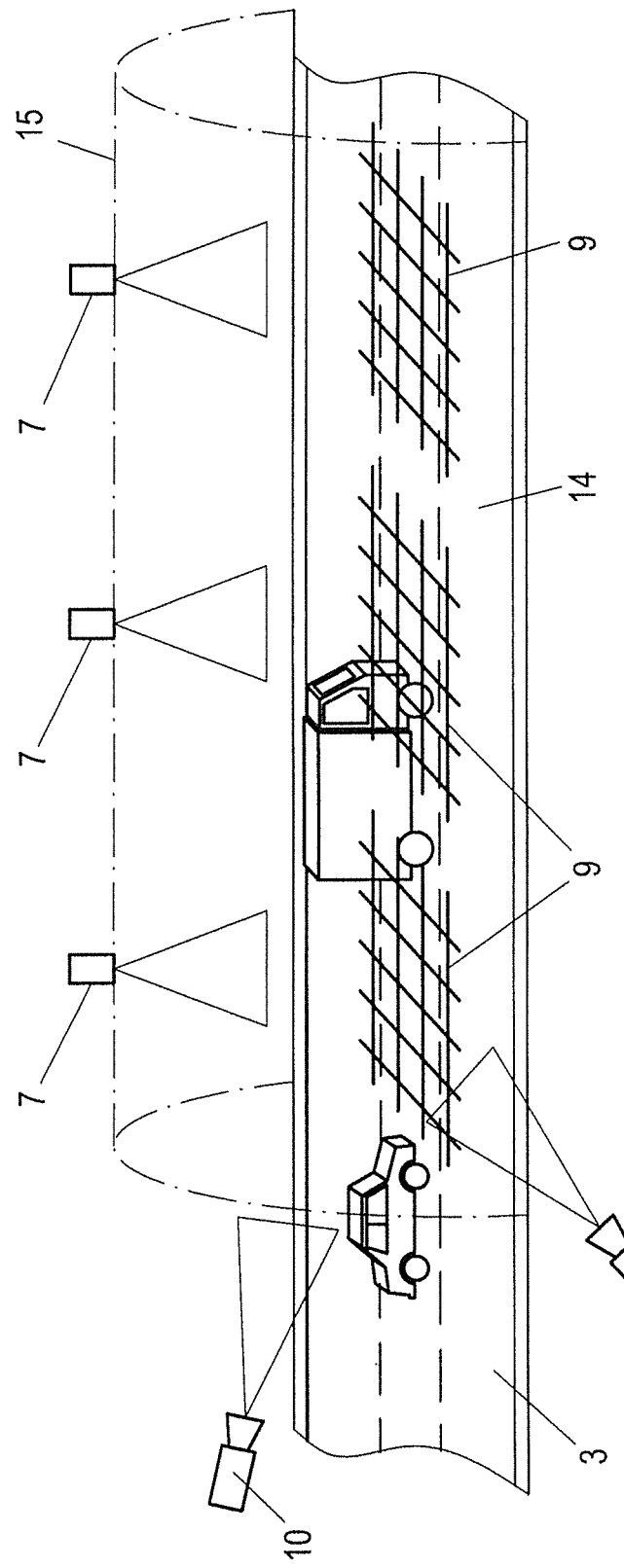
FIG. 3 is a schematic perspective view of a device showing a method of the invention for determining the distance between vehicles in a tunnel, according to some embodiments of the present invention.

FIG. 3 shows such a variant, which can be used at the same time—or exclusively—for measuring the distance between vehicles. It is understood, however, that the distance measurement shown here with reference to the embodiment of FIG. 3 could also only be conducted with a single light pattern projector 7.

FIG. 3 shows in a detail a roadway 3, a section 14 of which runs in a tunnel 15, on the ceiling of which multiple light pattern projectors 7 are consecutively mounted in order to jointly project a pattern of light 9, here a grid of light, onto the roadway 3. A single camera 10, which forms the light-section sensor 4 jointly with the light pattern projectors 7 and observes the distortions of the pattern of light 9 as a result of vehicles 2 passing in the section 14, is sufficient in the simplest case.

The camera 10 can look upwards and rearwards, for example, on the roadway 3 or—as in the variant 10' entered as alternative—from the side, e.g. by means of a wide-angle lens, to view the entire section 14.

Figure 4:
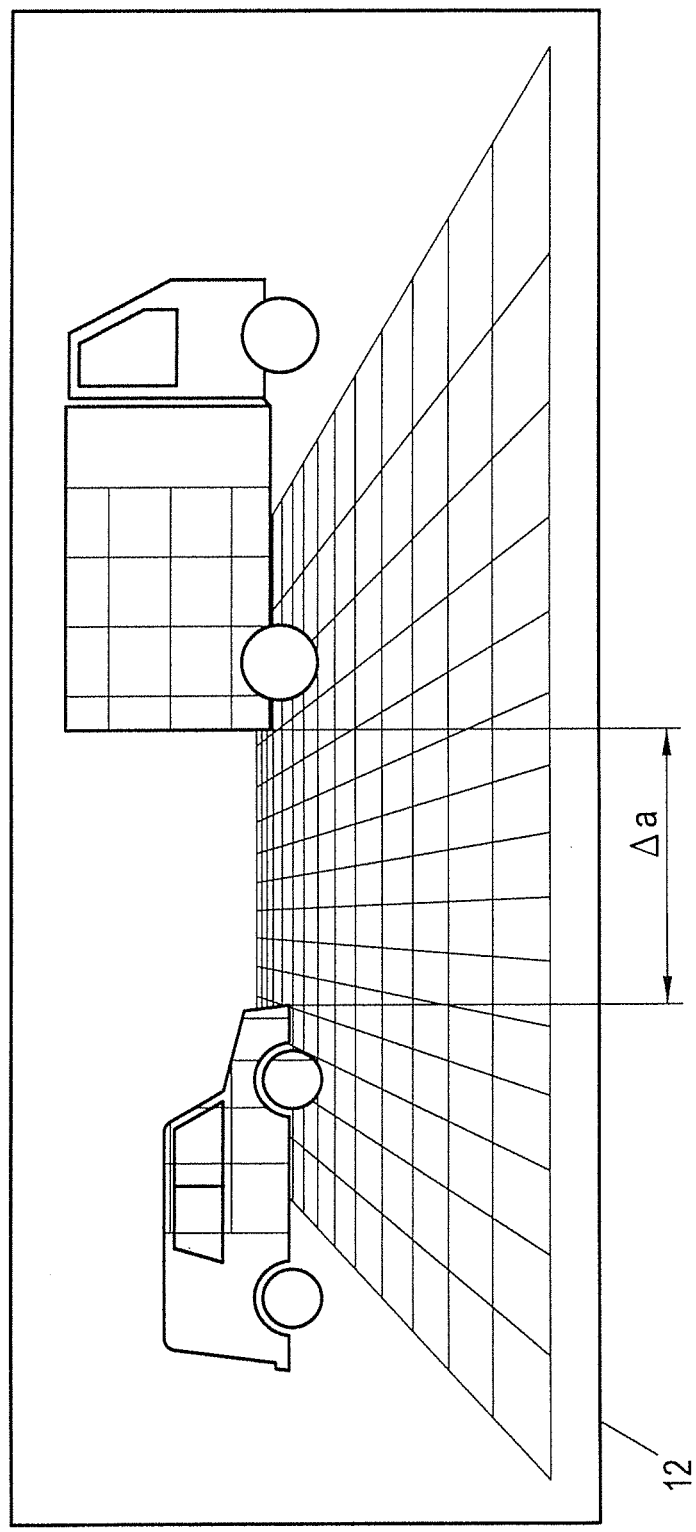
FIG. 4 shows a recording of a surface contour of vehicles in the tunnel determined with the device of FIG. 3.

The distance between the two vehicles 2 is determined from the distance Δa of two surface contours of vehicles 2 detected in this way. FIG. 4 shows an image 12 taken by the camera 10', from which the distance Δa can be determined by means of the evaluation unit 6.

The light-section sensor 4 can also be used to detect the mere presence of a vehicle 2 on the roadway 3 to activate further actions, e.g. a subsequent determination of direction, speed and/or distance by means of the device 1. In the simplest case, for such an activation only a single bar of light needs to be projected and its course in the images 12, 13 monitored for a disturbance, e.g. a bend or break, which indicates the presence of a vehicle 2 and can be monitored with very simple image processing means.

In the same way, the device can also be used as a trigger unit, for example, in order to start the actual measuring process, i.e. the observation of the projected pattern at a location can initiate the second process step (second recording). By calibrating the evaluation unit to the "empty" or "unoccupied" state of the traffic area, if there is no vehicle located in the traffic area, the presence of a vehicle in the traffic area can be detected in this case from a change or deviation in the detected surface contour in the "empty" state that exceeds a predefined threshold. By calibrating the projection pattern, calibrated distances can be read from the photographic evaluations, from which the speed, for example, can be determined.

The invention is consequently not restricted to the illustrated embodiments, but covers all variants and modifications that come within the scope of the attached claims.

What is claimed is:

1. A device for determining a direction and/or speed of a vehicle on a roadway comprising:
    at least one light projector configured to operate according to a light-section procedure and to project a pattern of light onto the roadway from a first location;
    a camera configured to record the projected pattern of light from a second location and record a surface contour of a vehicle from distortions of the recorded pattern of light; and
    an evaluation unit coupled to the at least one light projector and the camera and configured to determine the direction and/or speed of the vehicle from a displacement in surface contours of the vehicle in two time-consecutive recordings by the camera.

2. The device according to claim 1, wherein the at least one light projector is a laser or light-emitting diode emitter.

3. The device according to claim 1, wherein the camera is a traffic monitoring camera.

4. The device according to claim 1, wherein multiple adjacent devices are configured to work together in combination to follow the course of movements of vehicles.

5. The device according to claim 1, wherein the at least one light projector is configured to emit light in a narrow-band light frequency range in the infrared or ultraviolet range.

6. The device according to claim 1, wherein the light pattern is one of the group consisting of a single bar of light, a group of parallel bars of light, a grid of light, a diamond, and a circular pattern.

7. A device for determining a distance between two vehicles following one another on a roadway comprising:
   at least one light projector configured to operate according to a light-section procedure and to project a pattern of light onto the roadway from a first location,
   a camera configured to record the projected pattern of light from a second location and record surface contours of each of the two vehicles from distortions of the recorded pattern of light; and
   an evaluation unit coupled to the at least one light projector and the camera and configured to determine the distance between said vehicles from said surface contours of the vehicles recorded by the camera.

8. The device according to claim 7, wherein a plurality of light projectors are mounted consecutively on a ceiling of a tunnel, which project a grid of light recorded by a joint camera onto the roadway.

9. The device according to claim 7, wherein the at least one light projector is a laser or light-emitting diode emitter.

10. The device according to claim 7, wherein the camera is a traffic monitoring camera.

11. The device according to claim 7, wherein multiple adjacent sensors are actuated and scanned by the evaluation unit to follow the course of movements of the vehicle.

12. The device according to claim 7, wherein the at least one light projector is configured to emit light in a narrow-band light frequency range in the infrared or ultraviolet range.

13. The device according to claim 7, wherein the light pattern is one of the group consisting of a single bar of light, a group of parallel bars of light, a grid of light, a diamond, and a circular pattern.

14. A method for determining a direction and/or speed of a vehicle on a roadway comprising:
   a) projecting a pattern of light onto the roadway from a first location and recording a projected pattern of light from a second location to create a first recording of a surface contour of the vehicle from distortions of the pattern of light,
   b) repeating step a) at a later time to create a second recording of the surface contour of the vehicle, and
   c) determining the direction and speed of vehicle from a shift in said surface contour of the vehicle in the first and second recordings.

15. The method according to claim 14, wherein the projected pattern of light is recorded with a traffic monitoring camera.

16. A method for determining a distance between vehicles on a roadway comprising:
   projecting a pattern of light onto a section of the roadway from at least one first location;
   recording the projected pattern of light from a second location to detect surface contours of vehicles in the section of the roadway, from distortions of the pattern of light; and
   determining the distance between vehicles following one another in the section of the roadway from the detected surface contours of the vehicles.

17. The method according to claim 16, wherein the pattern of light is a grid of light, which is projected onto the roadway by multiple consecutive light pattern projectors in the section of the roadway.

18. The method according to claim 16, wherein the projected pattern of light is recorded with a traffic monitoring camera.

* * * * *